(12) United States Patent
Gopalakrishnan

(10) Patent No.: US 10,083,024 B2
(45) Date of Patent: Sep. 25, 2018

(54) APPLICATION AWARE VIRTUAL PATCHING

(71) Applicant: salesforce.com, inc., San Francisco, CA (US)

(72) Inventor: Amalkrishnan Chemmany Gopalakrishnan, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 23 days.

(21) Appl. No.: 14/956,129

(22) Filed: Dec. 1, 2015

(65) Prior Publication Data

US 2017/0153882 A1    Jun. 1, 2017

(51) Int. Cl.
*G06F 8/65* (2018.01)
*H04L 29/08* (2006.01)
*H04L 29/06* (2006.01)

(52) U.S. Cl.
CPC ............ *G06F 8/65* (2013.01); *H04L 63/1433* (2013.01); *H04L 67/02* (2013.01); *H04L 67/34* (2013.01)

(58) Field of Classification Search
CPC ..... G06F 8/65; G06F 8/68; G06F 8/67; G06F 8/66; H04L 63/1433; H04L 63/1441; H04L 67/02; H04L 67/34
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |

(Continued)

*Primary Examiner* — Jacob D Dascomb
(74) *Attorney, Agent, or Firm* — Sterne, Kessler, Goldstein & Fox P.L.L.C.

(57) ABSTRACT

The technology disclosed relates to thwarting attempts in between software releases to take advantage of security holes in web applications. A virtual patch is a data object comprising an identifier that indicates a relevant local context for the patch and may be created while the application is running. One or more conditions included in the patch are evaluated using data from a service request or from the local context. A patch directive specifies an action to perform when the one or more conditions are satisfied. A virtual patch may be applied to the running application without requiring replacing the application code. Responsive to a request for a web service, a web application may execute code in multiple distinct local contexts such as session management, authorization, and application-specific business logic. The code for each local context may independently retrieve a set of virtual patches relevant to its particular local context.

19 Claims, 9 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,346,762 B2 * | 3/2008 | Misra ................. G06F 9/30025 |
| | | 711/147 |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,423,993 B2 * | 4/2013 | Faus ........................ G06F 8/65 |
| | | 717/169 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0066999 A1 * | 3/2011 | Rabinovich ............... G06F 8/51 |
| | | 717/104 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0086688 A1 * | 4/2013 | Patel ...................... G06F 21/53 |
| | | 726/25 |
| 2013/0212497 A1 | 8/2013 | Zelenko et al. |
| 2013/0247216 A1 | 9/2013 | Cinarkaya et al. |
| 2014/0007075 A1 * | 1/2014 | Sporkert ................... G06F 8/68 |
| | | 717/173 |
| 2014/0189671 A1 * | 7/2014 | Dujmovic ......... G06F 17/30174 |
| | | 717/168 |

(56) References Cited

U.S. PATENT DOCUMENTS

2016/0196135 A1\* 7/2016 Mavinakayanahalli .. G06F 8/71
717/170

\* cited by examiner

FIG. 1 – Web Application Environment

```
[{
  "uri": "/00Q/o",
  "parameters": [{
    "data": "PARAMETER",
    "key": "postID",
    "value": "<xss>",
    "type": "SUBSTRING"
  }],
  "action": "LOG",
  "enable": true
}]
```

FIG. 5A

```
[{
  "uri": "/umpsinternal/session/status",
  "parameters": [{
    "data": "COOKIE",
    "key": "com.salesforce.LocaleInfo",
    "value": "(?i/^[a-zA-Z]{2}$/)",
    "type": "REGEX"
  },
  {
    "data": "PARAMETER",
    "key": "msg",
    "value": "^(\\s|\\w|\\d|<br>)*?$",
    "type": "REGEX"
  }],
  "action": "BLOCK",
  "enable": true
}]
```

FIG. 5B

```
[{
  "uri": "/p/pages/SensitivePage.jsp/",
  "parameters": [{
    "data": "USERPROFILEACCESS",
    "key": "",
    "value": "Administrator",
    "type": "MATCH"
  }],
  "action": "UPDATE STATE",
  "enable": true
}]
```

FIG. 5C

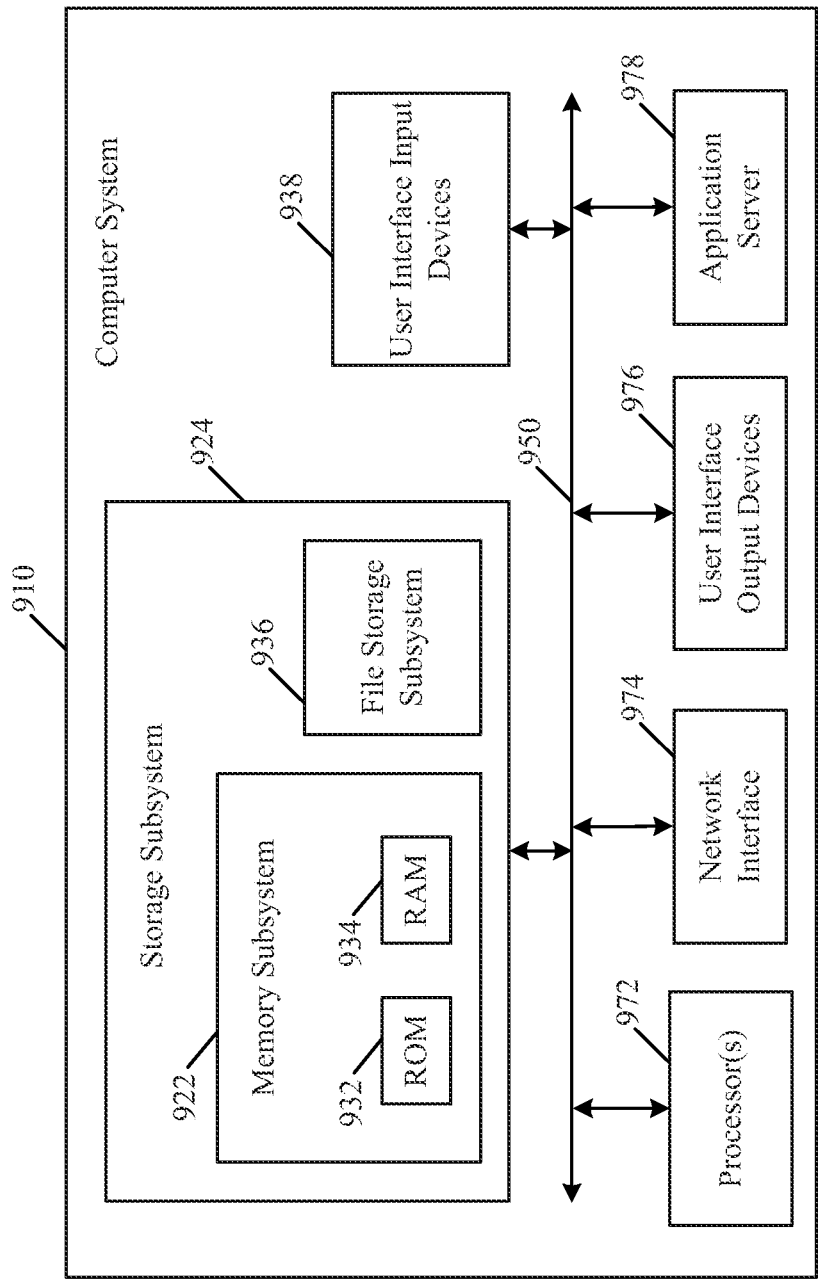
FIG. 9 – Computer System

APPLICATION AWARE VIRTUAL PATCHING

TECHNICAL FIELD

The technology disclosed relates generally to patching software at runtime. More specifically, the technology relates to creating patches that are specific to a local application state and affecting the processing of a protected software component without modifying or restarting the application.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves can also correspond to implementations of the technology disclosed.

Web applications are vulnerable to a variety of security issues. Because of the rapid nature of the development of the Web, several of these issues exist as specification weaknesses within fundamental web abstractions. For instance, all state changing web application operations are vulnerable to a Cross-site Request Forgery attack unless the web developer has defenses in place to prevent such an attack. Unprocessed user input when displayed could be vulnerable to Cross-site Scripting. The Web is a platform that is vulnerable by default unless special care has been made to ensure that security vulnerabilities are not introduced. The most common web vulnerabilities like Injection issues, Cross-site Scripting (XSS), and XML External Entity attacks (XXE) exist between abstraction layers as layer integration problems. XSS occurs when the data layer supplies improperly encoded or un-sanitized raw input to the HTML presentation layer. Because of how common web application vulnerabilities are and how devastating they can be for the enterprise, techniques to effectively and efficiently address them is vital for highly evolved web applications.

Virtual Patching is a technique that has been used to address vulnerabilities that can be detected and corrected before executing application-specific code. Many Web Application Firewalls (WAF) have the ability to virtual patch issues by assigning rules to HTTP traffic. For example, a detected denial of service attack can be address by installing a rule to reject HTTP requests sent to a particular IP address and port number having particular identifying information in the message. Such a rule can be applied when requesting any web application because an IP address and port number are known outside of the application (not private/local within the application). However, because a WAF is not contextually aware of the application that it is protecting, it is not possible to patch issues that require a deeper, integrated understanding of the application requirements or current state. For example, it is not possible to write a WAF rule to reject requests from users who have not already established a session because a user's session state is unknown outside of the application (and thus is application-specific). Application aware virtual patching hence allows applying rules that depend on application-specific state.

BRIEF DESCRIPTION OF THE DRAWINGS

The included drawings are for illustrative purposes and serve only to provide examples of different structures and process operations for one or more implementations of this disclosure. These drawings in no way limit any changes in form and detail that can be made by one skilled in the art without departing from the spirit and scope of this disclosure. A more complete understanding of the subject matter can be derived by referring to the detailed description and claims when considered in conjunction with the following figures, wherein like reference numbers refer to similar elements throughout the figures.

FIGS. 5A, 5B, and 5C each illustrates an example virtual patch, according to one implementation of the technology disclosed.

FIG. 9 shows a block diagram of one implementation of a multi-tenant environment.

DETAILED DESCRIPTION

Figure 1:
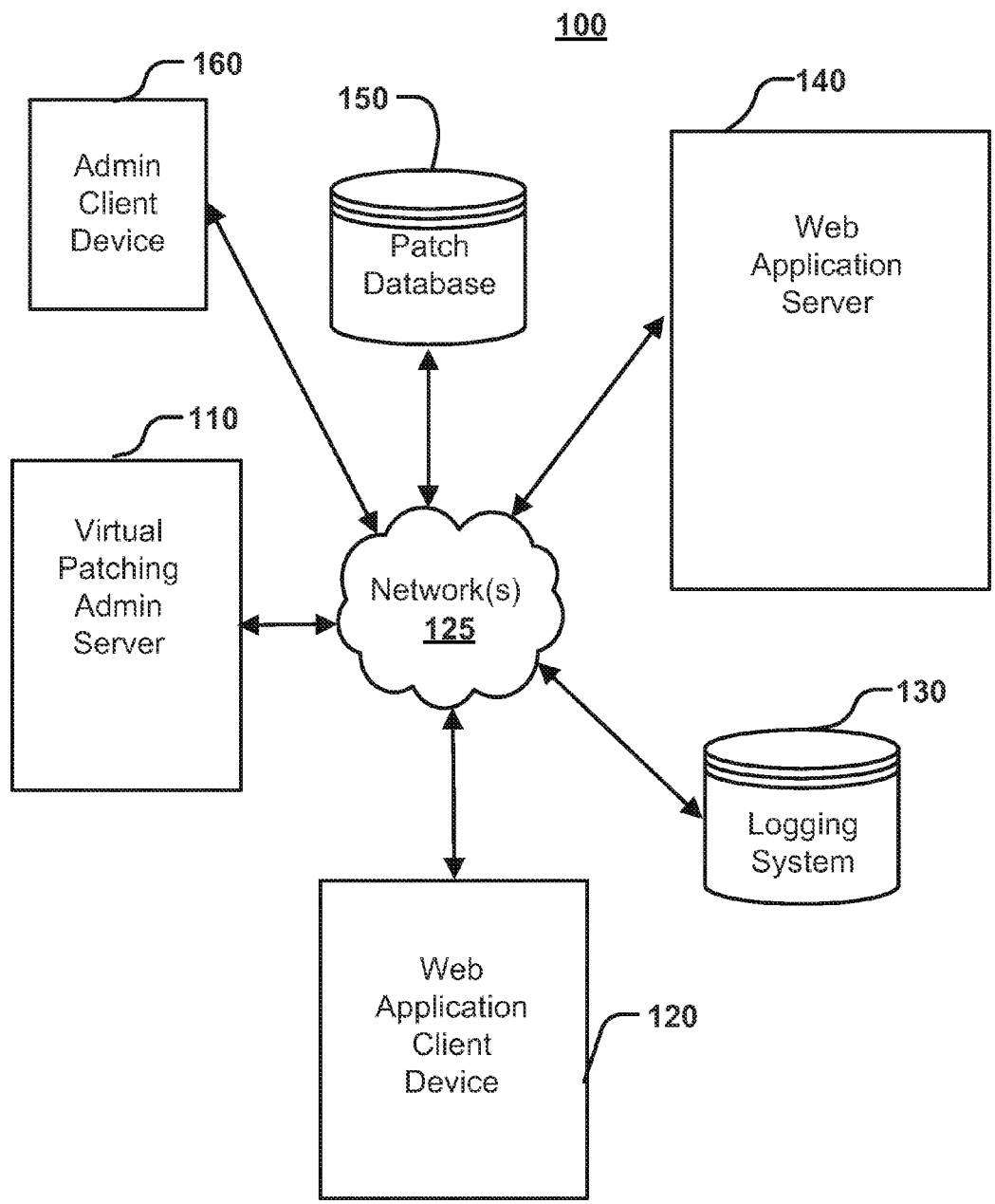
FIG. 1 illustrates a web application environment, according to an implementation of the technology disclosed.

The following detailed description is made with reference to the technology disclosed. Implementations are described to illustrate the technology disclosed, not to limit its scope, which is defined by the claims. Those of ordinary skill in the art will recognize a variety of equivalent variations on the description.

Terminology

A web application request includes identification of the web service being requested. "Application-specific code" is referred to herein as code that is executed, and corresponding state used, to provide the requested particular application web service, and which is different from the code and state used to provide a different requested application web service. "Application-independent" code/state is used herein to refer to code/state that is in the execution path when responding to a web application request but which is the same regardless of which web application service is being requested.

A software application may be partitioned into distinct components, each performing one or more tasks or functions. Data relevant for performing one task may not be needed by, and thus not available to, components performing different tasks. Data (state) used in one application component that is not available to the code in other components within the same application is referred to herein as local state of an application component, or application component context. In an embodiment, a web application may be deployed within a framework. Delivering an application request through a network to an application web service may be performed in one or more components external to the application itself, and thus these external components are application-independent. Software components performing user authentication and authorization enforce policies defined by an application, even when the code for enforcing these policies may be shared across applications, such as in a library.

A virtual patch is data that specifies a rule including a rule condition and a rule action. The rule condition comprises one or more predicates, each of which must evaluate to true in order for the rule condition to be satisfied. The rule action, also referred to as a virtual patch directive, is an action that is performed when the rule condition specified in the virtual patch is satisfied. Performing the rule action is also referred to as applying the virtual patch.

A filter is a module associated with a specific application context. The filter retrieves virtual patches that are relevant to that application context, determines which patches have rule conditions that are satisfied, and applies those and only those set of patches having rule conditions satisfied.

Introduction

A method and a system of creating an application aware virtual patching system within the web application is described herein. This module is fully integrated into the application and has the same awareness as any other business logic running in the application. This technique has capabilities that are beyond standard WAF virtual patching filters.

Standard filters have the intelligence to block issues based on hard-coded rules applied to HTTP traffic based on application-independent data. Since these rules are not aware of application-specific state (that is, they are not application context aware), such rules cannot be used to block issues specific to an application such as session, access control, and authorization vulnerabilities. For instance, a patch that depends on whether a user is of a specific group X can never be enforced because the patch enforcement code does not have access to the application session information, and thus does not know to which groups the user belongs.

There are several benefits to supporting an application aware virtual patching solution in an enterprise application. Remediation time for addressing a bug in an application component is a key metric used to assess the security maturity of an enterprise. With virtual patching, key issues can be addressed without a code check-in (that is, without changing the source code, rebuilding the application, testing, and deploying a new executable image). Large applications that have rigid release processes can greatly benefit from the plug and play nature of the security patches. Another benefit to virtual patching is that a patch need not be created by the code developer. Instead, a code developer may define one or more state variable names associated with context of a protected software component. The state variable names may be referenced only in a patch for that protected component, and a patch can be constructed by a non-programmer and/or by one who does not have knowledge of or access to the code for the protected software component. For example, several issues like XSS and access control issues can be fixed without a code level understanding of the application logic. This allows security engineers or security trained support engineers to apply patches without developer involvement. For example, if exploiting a specific XSS vulnerability requires a single quote character to be present and the user to be of a specific profile, the patch filter can be set to detect incoming data associated with the specific user profile and take action to prevent active attacks upon finding instances of the single quote character and its encoded variants.

Managing vulnerabilities in third party libraries is a hard problem for the enterprise. Virtual patching allows for a way to create application level restrictions on libraries in a patchable manner. Since the technique disclosed herein has visibility into the application logic, more advanced restrictions can be placed on access to third party libraries. For instance, application may be coded so that before calling an entry point in a third party library, patches may be retrieved and evaluated. If the conditions are satisfied for retrieved patches, a parameter value to the function call may be changed (such as replacing a request for a SHA-1 cryptographic hashing algorithm with a MD5 cryptographic hashing algorithm). Similarly, calling a third party library function may be bypassed and a different function may be invoked instead. In an embodiment, the different function may be a previous version of the function or a function in a different version of the library. The different function may also be a default function. In that way, if a vulnerability is discovered in the library, a patch can be applied to monitor the function call for malicious payloads targeting that vulnerability.

A virtual patch that is application aware can deal with issues as deep as the application designer wants to support. This is an engineering design based on the application because going deeper into the application may make the patch rule system very complex. For instance, a virtual patch could be applied to ensure that user U cannot access resource R when variable V of session context S has the value 'Malicious'.

Web Application Environment

FIG. 1 illustrates a web application environment, according to an implementation of the technology disclosed. Web application server 140 hosts a web application that provides a web service. Web application server 140 is an abstraction that may include several server-side components such as routers, web servers, application servers, and databases servers. Web application client device 120 sends web application service requests through network 125 to the web application server and receives a response back. The web application client device may be a user system running a web browser that communicates with the web application server 140 via the hypertext transfer protocol (HTTP). Thus, a web application service request comprises an http request that is addressed to the web application server and provides an indication of which service is requested and parameter values required for that service interface.

Virtual patching admin server 110 hosts an administrative interface that allows a virtual patching administrator to add, delete, enable and disable virtual patches. The administrator may use admin client device 160 to communicate through network 125 with virtual patching admin server 110. After a virtual patch is created, the virtual patching admin server may store the virtual patch in patch database 150. Patch database 150 may be any kind of data store that allows the searching for virtual patches based on certain attributes. The database may be stored on the virtual patching admin server and may optionally be stored in local storage of the server itself. The database may alternatively be stored on the web application server and may optionally be stored in the local storage of the web application server itself. The patch database may be stored on a database server distinct from the admin server and the web application server, and access to the database may be provided to both the virtual admin patching server and the web application server.

Logging system 130 stores logging messages for the web application. Logging the received service request is one of the actions that may be performed when applying a virtual patch. An interface may be provided that allows viewing of logged service requests resulting from a virtual patch and other events of interest.

Figure 2:
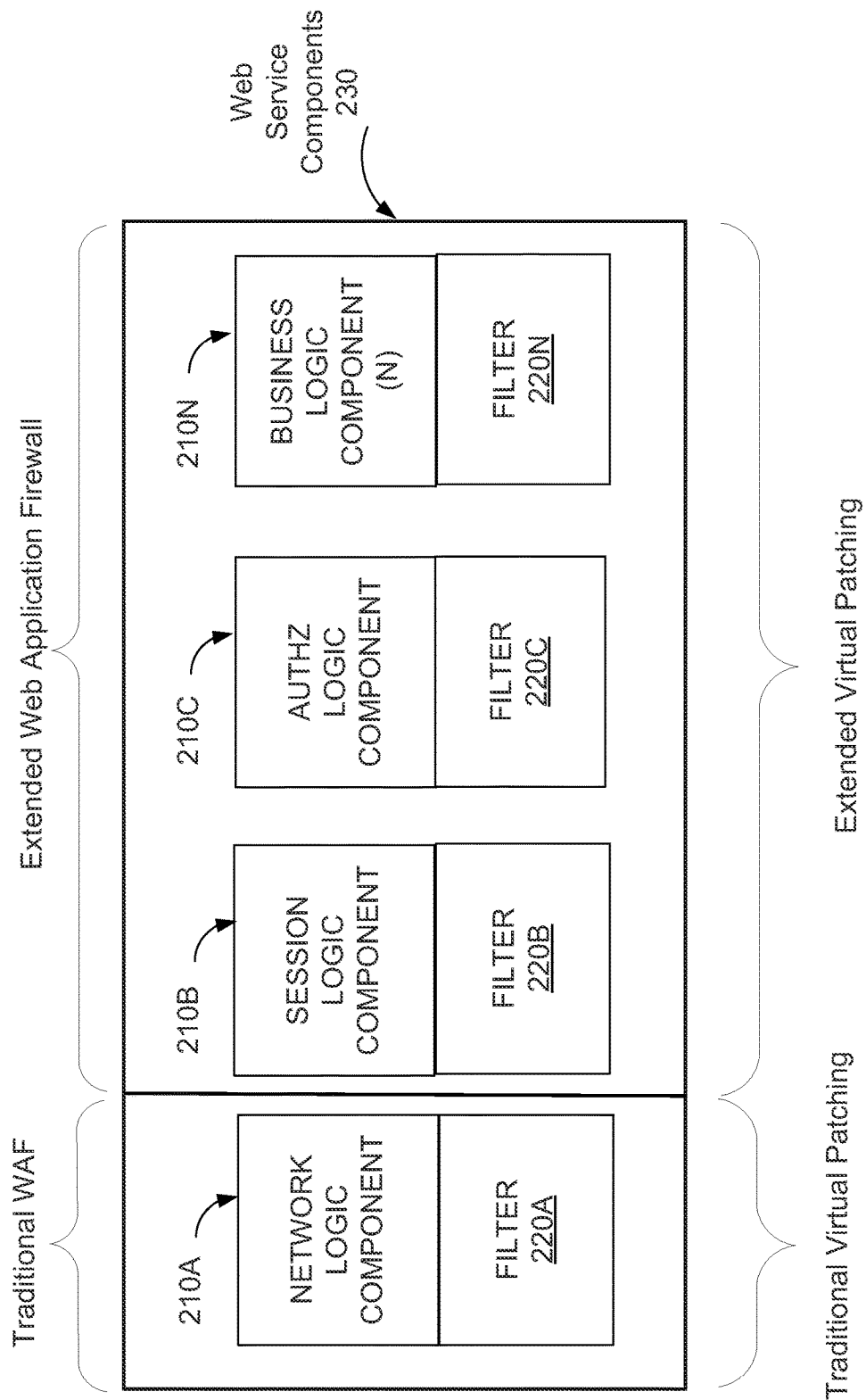
FIG. 2 is a block diagram illustrating certain components of a web application, according to an implementation of the technology disclosed.

FIG. 2 is a block diagram illustrating certain components of a web application, according to an implementation of the technology disclosed. When a web server receives a web service application request from a browser running on the web application client device, the request may be processed by a set of web service components 230. Some of the components, such as a network logic component 210A are application-independent, and could be patched in the context of a traditional WAF. However, the technique described herein for extending the WAF may also be used to patch application-independent components as well. Application components, such as session management 210B, authorization 210C, and one or more application business logic components 210N, are application specific and require the features of the extended WAF. Each of these components may implement a filter for processing virtual patches that may access the private state of the component. For example filter 220A may process virtual patches for a network logic component 210A; filter 220B may process virtual patches for a session management component 210B; filter 220C may process virtual patches for an authorization component 210C; and filter 220N may be provided for each of one or more application logic components 210N.

Infrastructure components that are shared across applications, such as in an application platform, may be instrumented once and used for all applications. When using such a framework, to create a new application, only the application business logic components need to be provided with an associated virtual patch filter.

Each filter 220x is associated with a particular application component, and searches and retrieves virtual patches that are associated with the same application component. The filter may search for patches previously stored in its local memory or in a storage device on the local server. Alternatively, the filter may issue a database query to a database server to retrieve all patches that are relevant to the application component. In another implementation, the virtual patching admin server may offer a patch retrieval interface that, when invoked by the filter, retrieves virtual patches stored locally and returns relevant patches to the filter.

Figure 3:
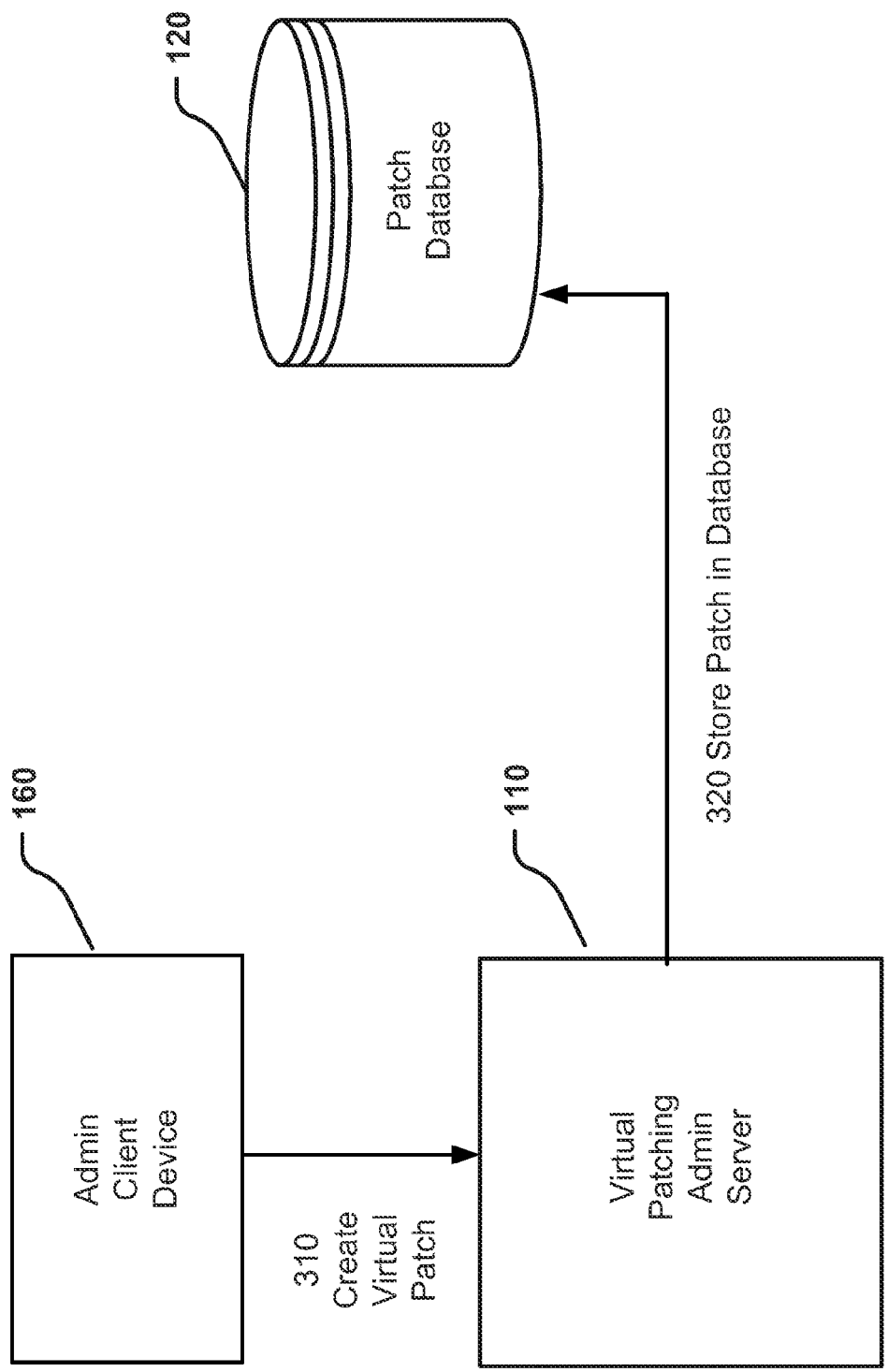
FIG. 3 is an illustration of an administrative client device interacting with a virtual patching administrative server to create a new application-aware virtual patch and store the patch in a database, according to one implementation of the technology disclosed.

FIG. 3 is an illustration of an administrative client device interacting with a virtual patching administrative server to create a new application-aware virtual patch (or revise an existing patch) and store the patch in a database, according to one implementation of the technology disclosed. An administrator may interact with a graphical user interface (GUI) to define or refine a virtual patch. The GUI may be provided by a client application running on the admin client device 160 or with a web browser displaying a web-based interface provided by the virtual patching admin server. Create Virtual Patch 310 interface is FIG. 3 represents any means of the admin client device 160 and the virtual patching admin server interacting to define or refine a virtual patch that the server stores for later retrieval. For example, the virtual patching admin server 110 may store a newly created or updated virtual patch in the database 320.

Figure 4:
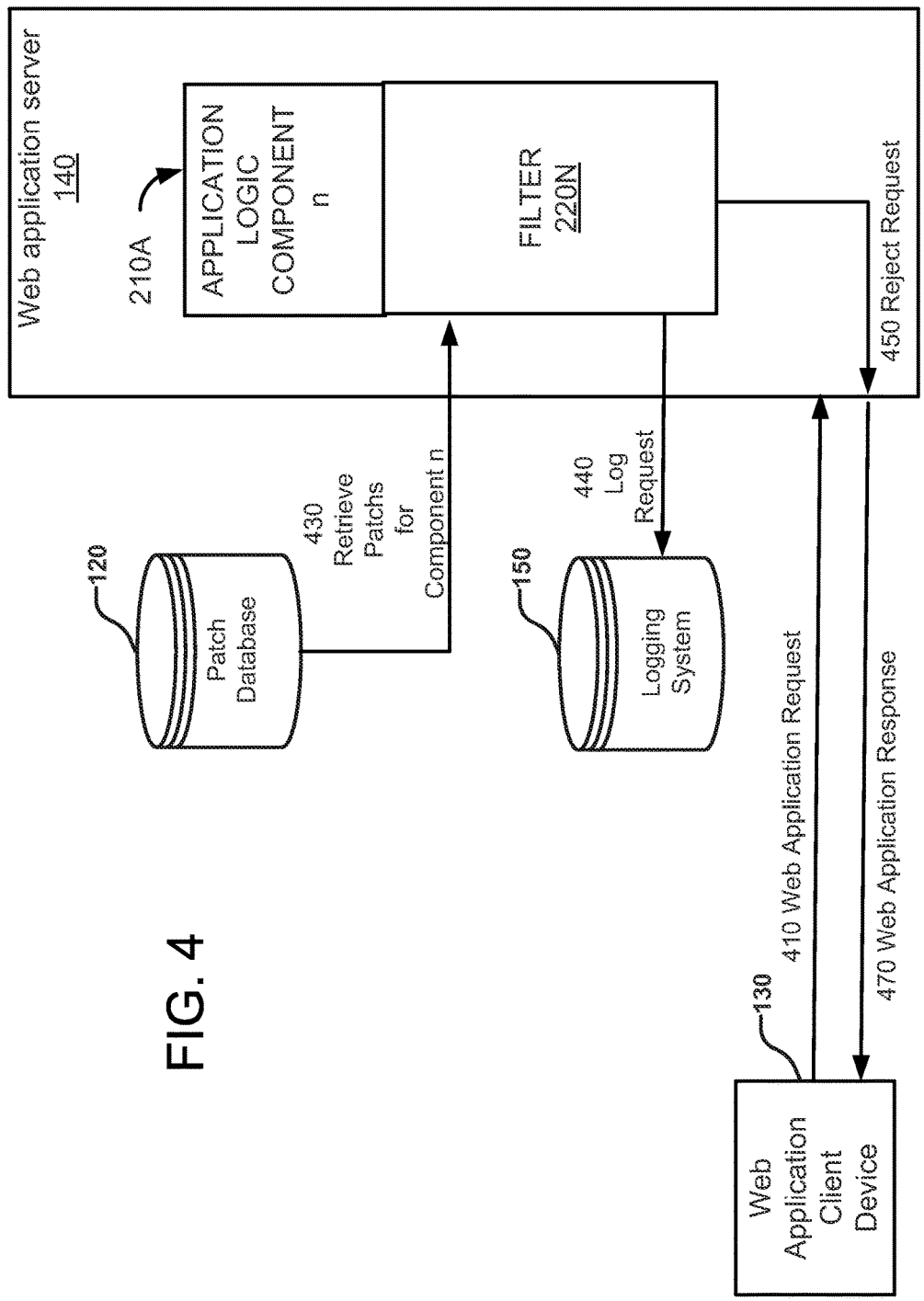
FIG. 4 illustrates a protected software component of a web application retrieving and applying virtual patches in response to receiving a web application request, according to one implementation of the technology disclosed.

FIG. 4 illustrates a protected software component of a web application retrieving and applying virtual patches in response to receiving a web application request, according to one implementation of the technology disclosed. Web application client device 130 may send a web application request 410 to the web service components 230. The web server passes the request to an application component 210A which transfers the request to its filter 220A. Filter 220A retrieves patches appropriate for the session component from patch database 120 by invoking an interface to retrieve patches relevant to module n 430. Filter 220A identifies one or more retrieved patches having a condition that matches the current state of the application component or service request. Filter 220A performs the patch directive (also referred to as the action) of those patches having a matching condition. For example, a directive may cause Filter 220A to reject the service request 450, and an error response may be returned to the client device without further application operations being performed. Another directive may cause Filter 220A to log the service request to the logging system 150 by invoking an interface 440. A directive may cause filter 220A to update local state such as modifying the service request (e.g. surrounding certain text with added quotation marks) or changing the value of a local state variable (e.g. override a user id in the local session state to represent a user with guest rather than administrator privileges). When filter 220A completes processing the relevant virtual patches, control may return to the application logic component n. The response to the request for service, whether an error or requested result is returned to the client device in 470 web application response.

FIGS. 5A and 5B illustrates example virtual patches, according to one implementation of the technology disclosed. The rule of the virtual patch shown in FIG. 5A is appropriate to be applied to an application component identified by "/00Q/o". Only one predicate is defined that indicates that the condition of the rule is satisfied when the value of the "postID" attribute in the "PARAMETER" header of the request includes the string "<xss>". When this condition is met, the web application is directed to log the request. The rule is enabled, and so will be used by the filter for the application component.

The rule of the virtual patch shown in FIG. 5B is more complex. This patch is appropriate for an application component identified by "/umpsinternal/session/status". Two predicates are defined that both must be true to satisfy the condition. The request must contain a cookie named "com..salesforce.LocaleInfo" that includes at least 2 lines of text and the request must contain a parameter attribute named "msg" that is an alphanumeric text without special characters. When both of these predicates are true, the web application is directed to block processing of the request.

The rule of the virtual patch shown in FIG. 5C shows the use of local application state that is changed by applying the rule. When the user's session in which the request was sent has administrator privileges, the privileges are changed to guest privileges.

Figure 6:
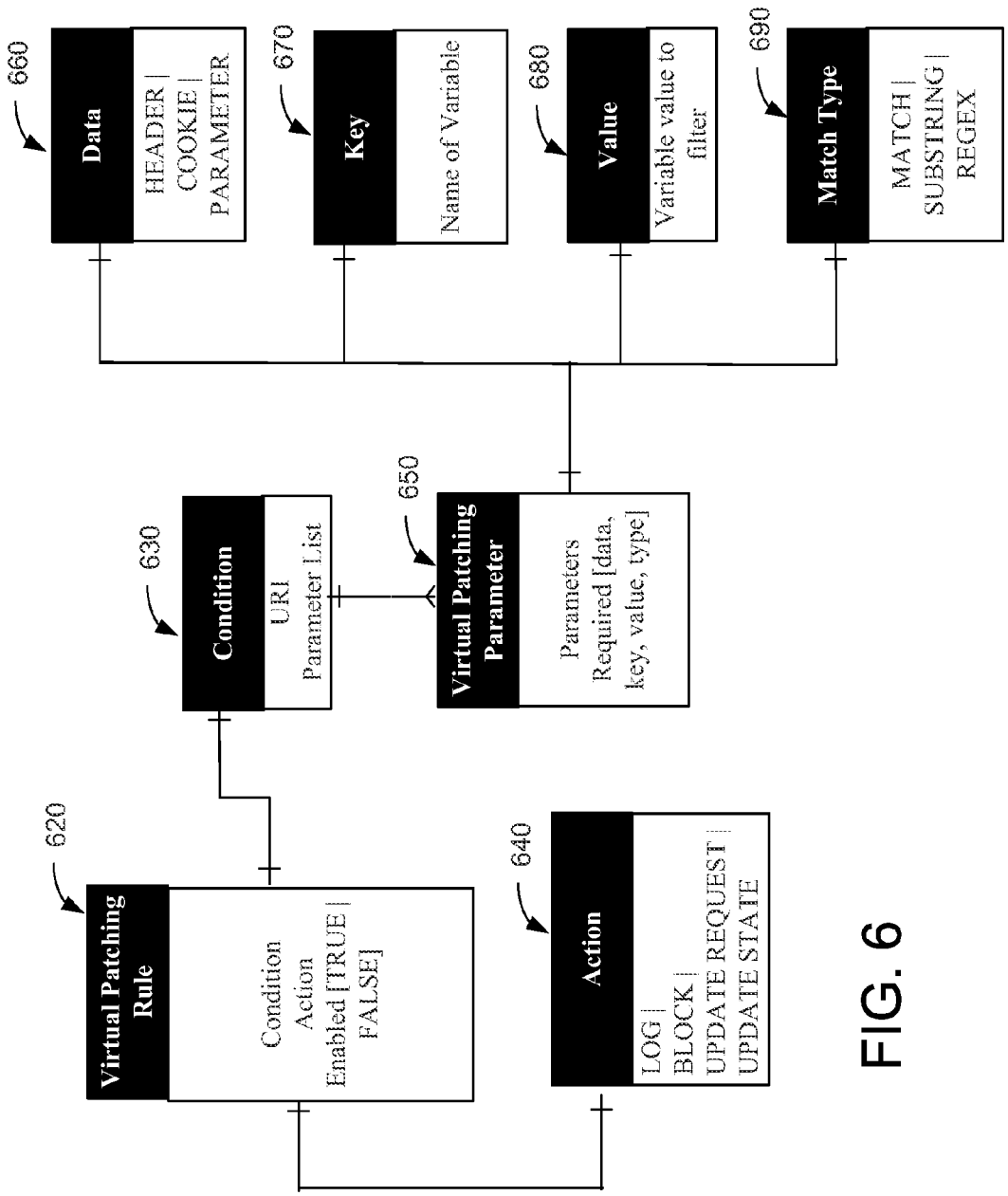
FIG. 6 is an example data structure diagram of a virtual patch ruleset for an application component, according to one implementation of the technology disclosed.

The example virtual patches illustrated in FIGS. 5A, 5B, and 5C are represented according to a data structure that is explained with respect to FIG. 6. FIG. 6 is a diagram illustrating an example data structure for a virtual patch ruleset, according to one implementation of the technology disclosed. The example data structure represents a virtual patch as a rule. A virtual patch ruleset may refer to all patches stored in the same data store, all patches associated with a particular web application or all patches relevant to a particular protected software component. In other words, a virtual patch ruleset is some collection of virtual patches.

Virtual Patching Rule 620 includes fields for condition, action, and enabled. The condition field specifies the conditions that need to be satisfied before the corresponding action is performed. The action field specifies the operation to perform when the condition of the rule is met (i.e. satisfied by matching aspects of the http request). Enabled indicates whether the rule should be used or ignored. A TRUE value in the enabled field indicates that the virtual patch should be used.

Condition data structure 630 includes a URI that identifies the context to which this patch applies. Each application component having a distinct set of patches may be assigned a unique URI, and the filter for the application component may search for patches having the matching URI. The parameter list may be a set of one or more virtual patching parameters 650 that define which portions of the http request need to match a specified value, and what kind of a match is needed. The parameters field is a list of one or more defined predicates, all of which must be satisfied (i.e. evaluate to true) for the condition of the rule to match the http request. An individual parameter in the list of parameters defines a predicate includes data 660, a key 670, a value 680, and a match type 690. An HTTP header may include many attribute/value pairs. The key 670 field of the parameter data structure identifies the name of an attribute, and a value 680 field of the parameter data structure identifies a sequence of characters that must match the attribute's value. Data 660 is the name of the state variable that filter module programmer has defined for making local state available for reference within a virtual patch. In the example in FIG. 6, the state variables all refer to portions of the http request itself. That is, the state variable indicates in which portion of the header the attribute/value pair is found. For example, if the data 660 field has a value "COOKIE", then key 670 identifies the name of the attribute within the COOKIE field of the http header. If data 660 field has a value "PARAMETER", then the key 670 identifies an attribute in the URL parameters. If data 660 field has a value of "HEADER", then the key identifies a parameter in any header field of the request header. Value 680 is the value that must match the value of the attribute/value pair having an attribute name matching key 670.

In a different example, a filter module for an access control application component may export a state variable GROUPNAME to represent the name of a group to which the user belongs. The Value 680 specified in the rule indicates a value to compare against the value of the specified state variables which may be retrieved from a local variable or other local state within the application component.

Match type 690 specifies what kind of match is required. For example, match type "MATCH" may require that the value 680 exactly literally (i.e. without interpretation of a pattern) match the value of the attribute/value pair. For example, a rule condition may be satisfied only if the value corresponding to the local state variable USERPROFILE-ACCESS exactly match "Administrator" to indicate that the user has administrator privileges. "SUBSTRING" may indicate that the condition is met if the value of the attribute/value pair literally includes value 680. For example, the condition shown in the rule of FIG. 5A would be true if the post-id parameter in the request message includes the string "<xss>". "REGEX" indicates that value 680 is a regular expression that is interpreted to match the value of the attribute value pair. For example, the first condition of the rule shown in FIG. 5B is met when the value of the msg parameter in the COOKIE header of the request message has a value that matches the regular expression "(?!/^[a-zA-Z]{2}$/)" that matches 2 alpha characters.

If every predicate represented in the list of virtual patching parameters 650 is satisfied, then the condition of the rule is met, and an operation specified in action 640 is performed. For example, a "BLOCK" operation may cause the web application to reject the request which may result in an error response returned to the requester. A "LOG" operation may cause the web application to log the http request in a particular way. For example, a statement may be logged with a warning based on the pattern that is matched (e.g. "Warning: <xss> included:" followed by the request string).

In an implementation, the action may also include UPDATE REQUEST and/or UPDATE STATE. UPDATE REQUEST may change the request by removing a parameter or modifying the value of a parameter in the request. For example, to avoid certain scripting attacks, the action may be to surround a parameter value with quotation marks. UPDATE STATE may modify a value of local state. For example, the access rights of a user previously granted Administrator privileges may be changed to having only Guest privileges.

Figure 7:
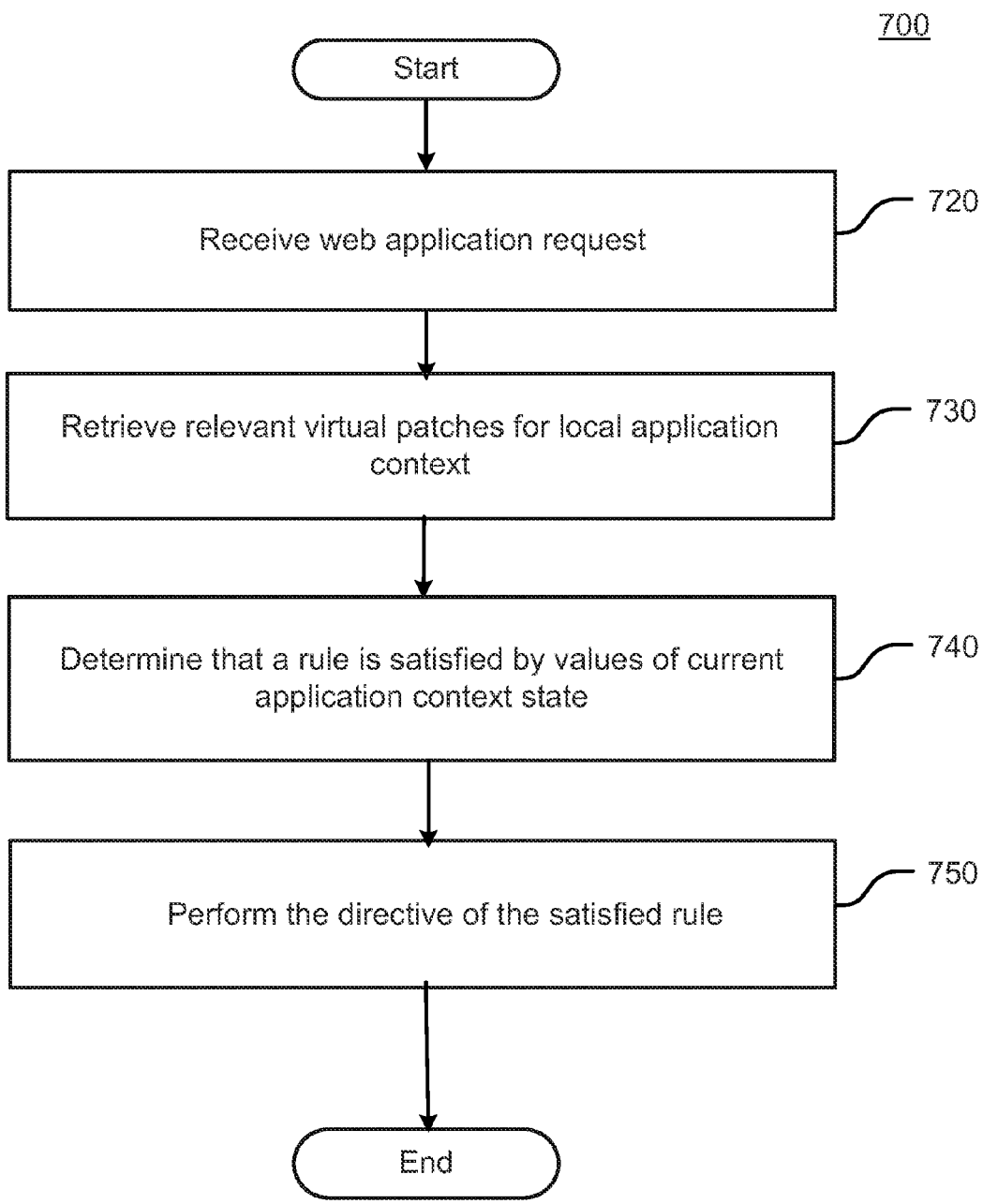
FIG. 7 is a flow diagram showing operations for retrieving and installing a virtual patch, according to one implementation of the technology disclosed.

FIG. 7 is a flow diagram showing operations for retrieving and installing a virtual patch in a particular software component, according to one implementation of the technology disclosed. In Step 720, an application component receives an http request. In Step 730, a filter for the application component retrieves one or more virtual patches that are relevant to the application component. In step 740, for each retrieved rule, the conditions of the rule are evaluated. For each rules in which all conditions are satisfied, in step 750, the filter applies the rule, meaning that the filter performs the action specified in the rule.

Figure 8:
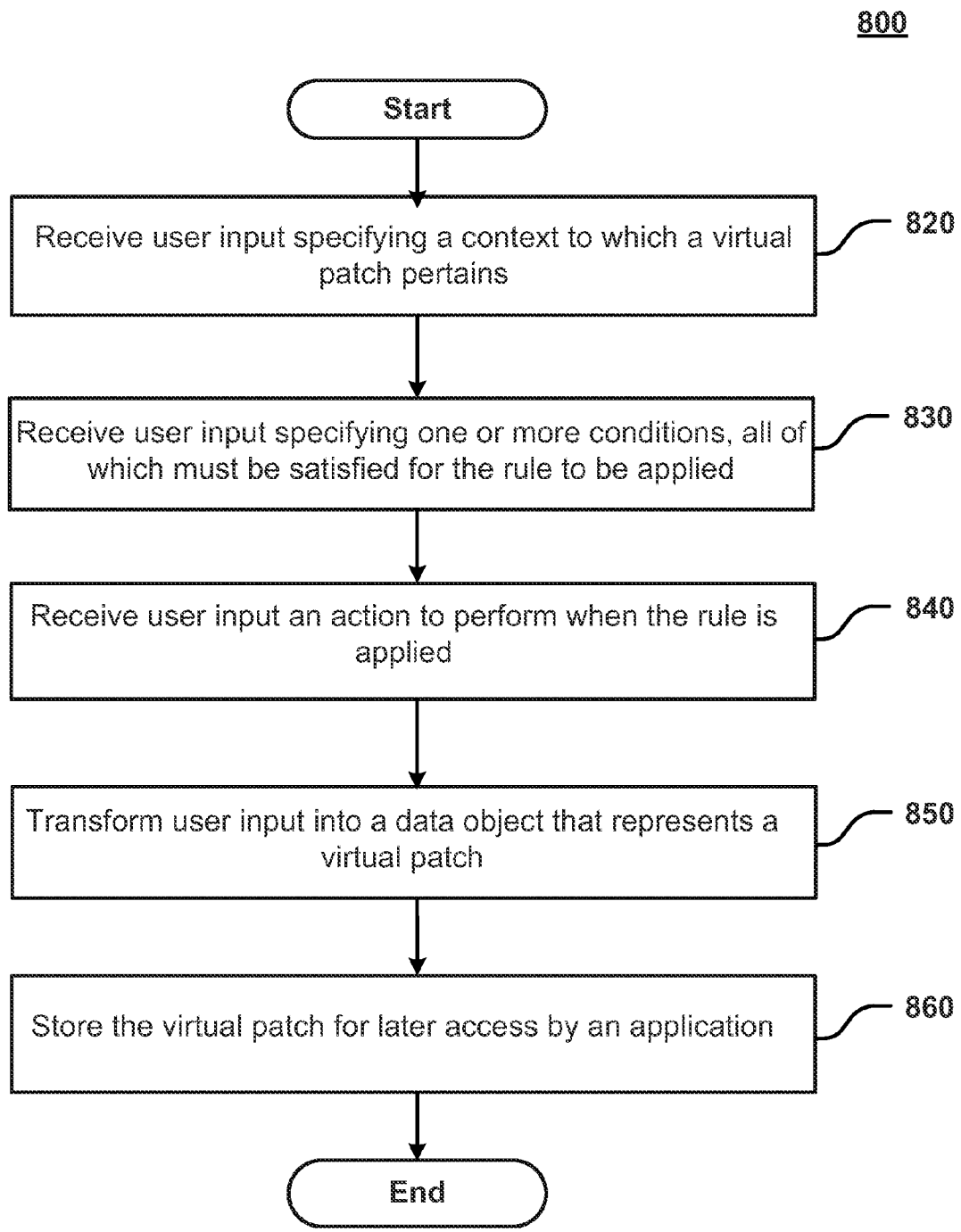
FIG. 8 is a flow diagram showing operations for creating and storing a virtual patch, according to one implementation of the technology disclosed.

FIG. 8 is a flow diagram showing operations for creating and storing a virtual patch, according to one implementation of the technology disclosed. An administrator interacts with a user interface to create a new virtual patch. For each virtual patch, the administrator specifies a context to which the virtual patch pertains (step 820). The context is specified so that an application component can search on the context identification and retrieve patches that are appropriate for the context provided by the component. The administrator enters one or more conditions that must be met for the rule to be applied in Step 830. The conditions reference local state names that are defined for the relevant application component and made known to the administrators. In Step 850, the administrator assigns a directive to the virtual patch that specifies an action to be performed when the conditions are met. The administrator input is transformed into an internal data structure representation in Step 850 and stored for later retrieval in step 860.

Computer System

The subject matter described in this specification can be implemented as a method or as a system or using computer program products, tangibly implemented in information carriers, such as a CD-ROM, a DVD-ROM, a semiconductor memory, and a hard disk on distributed computing solutions like MapReduce, Apache Spark™, Apache Yarn™, Apache Hive™ Apache Shark™, Apache Storm™ or Tez™. Such computer program products may cause a functional processing apparatus to conduct one or more operations described herein.

FIG. 9 is a block diagram of an example computer system 900. FIG. 9 is a block diagram of an example computer system, according to one implementation. The processor can be an ASIC or RISC processor. It can be an FPGA or other logic or gate array. It can include graphic processing unit (GPU) resources. Computer system 910 typically includes at least one processor 972 that communicates with a number of peripheral devices via bus subsystem 950. These peripheral devices can include a storage subsystem 926 including, for example, memory devices and a file storage subsystem, customer interface input devices 938, customer interface output devices 978, and a network interface subsystem 976. The input and output devices allow customer interaction with computer system 910. Network interface subsystem 976 provides an interface to outside networks, including an interface to corresponding interface devices in other computer systems.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all different types of devices and ways to input information into computer system 910.

User interface output devices 978 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all different types of devices (tablets, cell phones, smart phones, PCs, laptops) and ways to output information from computer system 910 to the user or to another machine or computer system.

Storage subsystem 926 stores programming and data constructs that provide the functionality of some or all of the modules and methods described herein. These software modules are generally executed by processor 972 alone or in combination with other processors.

Memory 922 used in the storage subsystem can include a number of memories including a main random access memory (RAM) 934 for storage of instructions and data during program execution and a read only memory (ROM) 932 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 926, or in other machines accessible by the processor.

Bus subsystem 950 provides a mechanism for letting the various components and subsystems of computer system 910 communicate with each other as intended. Although bus subsystem 850 is shown schematically as a single bus, alternative implementations of the bus subsystem can use multiple busses. Computer system 910 can be of varying types including a workstation, server, computing cluster, blade server, server farm, or any other functional processing system or computing device. Due to the ever-changing nature of computers and networks, the description of computer system 910 depicted in FIG. 9 is intended only as one example. Many other configurations of computer system 910 are possible having more or fewer components than the computer system depicted in FIG. 9. Application server 980 can be a framework that allows the applications of computer system 600 to run, such as the hardware and/or software, e.g., the operating system.

One of ordinary skill in the art can appreciate that a computer or other client device can be deployed as part of a computer network. In this regard, the technology disclosed pertains to any computer system having any number of memory or storage units, and any number of applications and processes occurring across any number of storage units or volumes. The technology disclosed can apply to an environment with server computers and client computers deployed in a network environment, having remote or local storage. The technology disclosed can also apply to a standalone computing device, having programming language functionality, interpretation and execution capabilities.

The technology disclosed can be implemented in the context of any computer-implemented system including a database system, a multi-tenant environment, or the like. Moreover, this technology can be implemented using two or more separate and distinct computer-implemented systems that cooperate and communicate with one another. The disclosed technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims. In some implementations, data stores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Particular Implementations

In one implementation, a method for patching code for web apps in between software releases is described. The method includes receiving a particular web application request comprising request data and retrieving a set of virtual patches relevant to a particular local web application context. A virtual patch is a data object that identifies a protected component of the web application and a rule. The virtual patch is to be applied by the protected component it identifies and the rule contains a condition referencing at least one of: a value of one or more parameters the web application request and a value of a local state variable in the particular local context. The condition is evaluated using portions of the request data referenced. The rule also includes a directive that specifies at least one action to be performed when the rule condition is satisfied.

In some implementations, the request data may comprise an http request message including at least HEADER data and optionally COOKIE or PARAMETER data. A value in the Universal Resource Identifier (URI) of the http header may be used to derive the identity of the protected application component having local context. Protected application components containing private state may include a session component and an authorization component. In some implementations a virtual patch may be expressed in XML. The particular web application request may be received by the web application during execution, and a matching virtual patch is applied without replacing web application code or restarting the web application. At least one condition of a virtual patch invokes a function that is only accessible within the local context to retrieve a data value in the local context. A virtual patch may be received from an administrative console and stored, wherein the virtual patch is stored after the web application is ready to receive web application requests. The directive included in the virtual patch may be one of blocking the web application request from being processed and logging data from the web application request. The condition included in the virtual patch includes a parameter name, a matching type, and a string, in which the matching type is one of MATCH, SUBSTRING, REGULAR EXPRESSION, and the condition is satisfied when one of the following is true: the matching type is MATCH and the string exactly matches the value of the named parameter, the matching type is SUBSTRING, and the string is a sub string of the value of the named parameter, or the matching type is REGULAR EXPRESSION, and the string is a regular expression that matches the value of the named parameter.

In one implementation, a method includes preparing virtual patches for deployment as temporary fixes to web applications. The method includes transforming user input into a data object that specifies a virtual patch. The virtual patch is defined to change how a http request message is processed by a web application. The attributes of the virtual patch include a particular context specification that identifies a protected component of the web application that will apply test input against the virtual patch. The patch also includes a condition that references a value of a parameter in the http request message or a value of a local state variable in the specified particular context. In addition, the patch includes a directive that specifies at least one action to be performed when the condition is satisfied. The actions include at least one of blocking the http request message from being further processed or logging data from the http request message. The method further includes storing the virtual patch in a manner retrievable by or pushable to the web application.

In some implementations, the directive action may specify changing the value of data in the http request message or changing the value of one or more application state variables. The method may further include pushing the virtual patch to the web application which it patches. The method may also include storing the virtual patch in a database that is directly accessible by the web application which it patches and receiving a request for undelivered virtual patches and delivering the virtual patch to the web application which it patches.

The subject matter described in this specification can be implemented as a method or as a system or using computer program products, tangibly implemented in information carriers, such as a CD-ROM, a DVD-ROM, a semiconductor memory, and a hard disk on distributed computing solutions. Such computer program products may cause a functional processing apparatus to conduct one or more operations described herein.

This method and other implementations of the technology disclosed can include one or more of the following features and/or features described in connection with additional methods disclosed. In the interest of conciseness, the combinations of features disclosed in this application are not individually enumerated and are not repeated with each base set of features.

APPENDIX A

Appendix A provides pseudocode not conforming to any particular programming language syntax that should suggest to programmers how application component logic may be enhanced to incorporate the functionality described herein.

Table 1 shows pseudocode for an application component that receives a request and executes logic specific to the component. Before the component specific logic is invoke, a call to a corresponding filter may be called, passing the request. If the filter returns a value that indicates that the subsequent processing should be avoided (blocked, aborted, etc), then no further application logic is executed. Otherwise, the component proceeds as usual. "X" is used to represent the name of a particular component, and to emphasize that the filter used for one component X is different from the filter used for a different component Y.

TABLE 1

Application Component Pseudocode

```
Application ComponentX (request) {
    If XFilter(request) == ABORT;
        Abort( );
    /* component logic here */
}
```

A component filter retrieves all patches identified in a certain way. In the example in Table 2, the filter is a session context filter and searches for patches having a uri of "/p/pages/SensitivePage.jsp/" as in the example virtual patch of FIG. 5C. The list of patches retrieved is iterated through, and the conditions of each patch are evaluated. For those patches where all conditions are satisfied, the action is performed.

TABLE 2

Filter

```
Boolean XFilter(request) {
    sessionContextIdentifier = "/p/pages/SensitivePage.jsp/";
    patches = getVirtualPatches(Session ContextIdentifier);
    for each rule in patches (
        If (evaluateConditions(rule.parameters) ==
        CONDITIONS_SATISFIED){
            return takeAction(rule.action);
        } else return CONTINUE_PROCESSING;
    }
}
``` evaluteConditions evaluates the each indicate predicate to determine if the condition is met. Table 3 shows pseudocode for evaluate( ) that returns an indication of whether the predicate evaluates to true and thus that the condition is met.

TABLE 3 evaluate predicate

```
Boolean evaluate(predicate) {
    switch(predicate.data) {
    case USERPROFILEACCESS:
        switch(predicate.type){
        case EXACT: {
            if !strcmp(sessionVariable.getUserProfileType,
            predicate.value)){
                return PREDICATE_NOT_TRUE;
            }
        case SUBSTRING:
            if !substr(sessionVariable.getUserProfileType,
            predicate.value)){
                return PREDICATE_NOT_TRUE;
            }
        case REGEX:
            if !regex(sessionVariable.getUserProfileType,
            predicate.value)){
                return PREDICATE_NOT_TRUE;
            }
        }
        return PREDICATE_TRUE;
}
```

The outer switch statement selects the local state specified by the data field of the condition. In the example, session data named USERPROFILEACCESS is specified. Other session-related state variables may also be listed here for processing conditions that reference those variables. The inner switch statement evaluates the condition according to the match type specified in the condition. If an exact match is required, a string comparison may be performed between the value field of the condition and the local variable holding the value for USERPROFILEACCESS. If a partial match is required, a substring function looks for the content of the value field of the condition as a substring of the value of the local variable represented by USERPROFILEACCESS. If a regular expression is specified, a function attempts to match the regular expression in the value field of the condition against the local variable.

In table 2, a routine takeAction is called to perform the action specified in the rule. Table 4 shows some pseudocode for the takeAction routine. The switch statement includes a

TABLE 4 takeAction( )

```
boolean TakeAction(action){
    Switch(action){
    Case(LOG) {
        Printf("[Virtual Patch][Log Only]," + FormatDate(currentTime)
        +"," + vPath.id);
        Return CONTINUE_PROCESSING;
    }
    Case(BLOCK){
        Return ABORT;
    }
    Case(UPDATE STATE){
        if (userState.isAdmin( ) &&
    listOfVirtualPatchBlockedGroups.find(userState.group)) {
        /* Apply virtual patch to downgrade user's access to servlet */
            tempGuestSession =
            request.getSession.retrieveSessionAs('GUEST')
            getResourceAs('sensitiveServlet', tempGuestSession) //
            patch forces
            access to page under a temporary Guest session
        }
        Return CONTINUE_PROCESSING;
    }
}
``` case for each different action supported by the filter. If the action is LOG, then a message is written into the log. If the action is BLOCK, then processing of the request is aborted. If the action is UPDATE_STATE or UPDATE_REQUEST, then the value of the local variable or request parameter respectively identified in the data field is updated.

What is claimed is:

1. A computer-implemented method for patching code for web apps in between software releases, the method comprising:
   receiving a particular web application request comprising request data;
   retrieving by a filter implemented by one of a plurality of application components, the filter for processing virtual patches that access a private state of the one of the plurality of application components implementing the filter, a set of virtual patches relevant to a particular application-specific local context of a distinct application component within a web application partitioned into a plurality of distinct application components, wherein a virtual patch of the set of retrieved virtual patches is a data object that comprises:
      a particular context specification that identifies a protected logic component to which control may be returned of the web application that will apply test input against the virtual patch;
      a condition applying to the request data and referencing:
         a value of one or more parameters in an http request message that invokes an interface in the web application; and
         a value of a local state variable in the particular application-specific local context; and
      a directive that specifies at least one action to be performed when the condition is satisfied;
   in the filter of the one of the plurality of application components that implements the filter, using portions of the request data referenced by the condition to satisfy the condition; and
   responsive to satisfying the condition, applying by the filter, the virtual patch to at most the one of the plurality of application components that implements the filter and having a current application-specific local context that matches the retrieving virtual patches by performing the directive.

2. The computer-implemented method of claim 1, wherein a plurality of application-specific components each retrieves respective virtual patches.

3. The computer-implemented method of claim 1, wherein the request data comprises an http request message including at least HEADER data and optionally COOKIE or PARAMETER data.

4. The computer-implemented method of claim 3, where the identification of the particular local context is derived from a value in the Universal Resource Identifier (URI) of the http header.

5. The computer-implemented method of claim 1, wherein the particular local context includes private state data maintained by one of a set of protected components including at least a session component and an authorization component.

6. The computer-implemented method of claim 1, wherein a virtual patch is expressed in XML.

7. The computer-implemented method of claim 1, wherein the particular web application request is received by the web application during execution, and a matching virtual patch is applied without replacing web application code or restarting the web application.

8. The computer-implemented method of claim 1, wherein the condition of a virtual patch invokes a function that is only accessible within the local context to retrieve a data value in the local context.

9. The computer-implemented method of claim 1, wherein a virtual patch is received from an administrative console and stored, wherein the virtual patch is stored after the web application is ready to receive web application requests.

10. The computer-implemented method of claim 1, wherein the directive included in the virtual patch is one of:
   block the web application request; and
   log the web application request.

11. The computer-implemented method of claim 1, wherein the condition included in the virtual patch includes a parameter name, a matching type, and a string, wherein:
   the matching type is one of MATCH, SUB STRING, REGULAR EXPRESSION; and
      the condition is satisfied when one of the following is true:
         the matching type is MATCH and the string exactly matches the value of the named parameter;
         the matching type is SUBSTRING, and the string is a substring of the value of the named parameter; or
         the matching type is REGULAR EXPRESSION, and the string is a regular expression that matches the value of the named parameter.

12. The computer-implemented method of claim 1, further comprising preparing a plurality of virtual patches for deployment as temporary fixes to a plurality of web applications, the preparing comprises:
   transforming user input into a particular data object that specifies a particular virtual patch to change how a http request message is processed by a particular web application, wherein attributes of the particular virtual patch comprise:
      a specification of a respective particular context that identifies a respective protected logic component to which control may be returned of the particular web application that will apply test input against the particular virtual patch;
      a particular condition that references at least one of:
         a particular value of a parameter in an http request message that invokes an interface in the particular web application; and
         a value of a particular local state variable in the respective particular context; and
      a particular directive that specifies at least one particular action to be performed when the particular condition is satisfied, the at least one particular action including:
         block the http request message from being further processed; and
         log data from the http request message; and
   storing the particular virtual patch in a manner retrievable by or pushable to the particular web application.

13. The computer-implemented method of claim 12, wherein the directive specifies one of the following further actions to be performed:
   change the value of data in the http request message; and
   change the value of one or more application state variables.

14. The method of claim 12, wherein the method is performed by an administrative console and the particular virtual patch is received from a user through a user interface.

15. The computer-implemented method of claim 12, wherein storing the particular virtual patch comprises one or more of:
   pushing the particular virtual patch to the particular web application which it patches;
   storing the particular virtual patch in a database that is directly accessible by the particular web application which it patches; and
   receiving a request for undelivered virtual patches and delivering the particular virtual patch to the particular web application which it patches.

16. The method of claim 1, wherein each distinct application component includes its own application-specific local context comprising one or more tasks or functions performed by the distinct application component and a data state including at least data used in the application component that is not available to code in other application components within the same application.

17. The method of claim 1, wherein a filter is on same side of a firewall as the application component that implements the filter.

18. A non-transitory computer readable memory storing instructions for patching code for web apps in between software releases, wherein the instructions perform:
   receiving a particular web application request comprising request data;
   retrieving by a filter implemented by one of a plurality of application components on the same side of a firewall as the one of the plurality of application components, the filter for processing virtual patches that access a private state of the one of the application components implementing the filter, a set of virtual patches relevant to a particular application-specific local context of a distinct application component within a web application partitioned into a plurality of distinct application components, wherein a virtual patch of the set of retrieved virtual patches is a data object that comprises:
      a particular context specification that identifies a protected logic component to which control may be returned of the web application that will apply test input against the virtual patch;
      a condition applying to the request data and referencing:
         a value of one or more parameters in an http request message that invokes an interface in the web application; and
         a value of a local state variable in the particular application-specific local context; and
      a directive that specifies at least one action to be performed when the condition is satisfied;
   in the filter of the one of the plurality of application components that implements the filter, using portions of the request data referenced by the condition to satisfy the condition; and
   responsive to satisfying the condition, applying by the filter, the virtual patch to at most the one of the plurality of application components that implements the filter and having a current application-specific local context that matches the retrieving virtual patches by performing the directive.

19. A web server that patches code for web apps in between software releases, the web server comprising:
   a processor coupled to a network interface and a memory storing instructions that perform:
      receiving a particular web application request comprising request data;

retrieving by a filter implemented by one of a plurality of application components on the same side of a firewall as the one of the plurality of application components, the filter for processing virtual patches that access a private state of the one of the plurality of application components implementing the filter, a set of virtual patches relevant to a particular application-specific local context of a distinct application component within a web application partitioned into a plurality of distinct application components, wherein a virtual patch of the set of retrieved virtual patches is a data object that comprises:
  a particular context specification that identifies a protected logic component to which control may be returned of the web application that will apply test input against the virtual patch;
  a condition applying to the request data and referencing:
    a value of one or more parameters in an http request message that invokes an interface in the web application; and
    a value of a local state variable in the particular application-specific local context; and
  a directive that specifies at least one action to be performed when the condition is satisfied;
in the filter of the one of the plurality of application components that implements the filter, using portions of the request data referenced by the condition to satisfy the condition; and
responsive to satisfying the condition, applying by the filter, the virtual patch to at most the one of the plurality of application components that implements the filter and having a current application-specific local context that matches the retrieving virtual patches by performing the directive.

* * * * *